United States Patent
Crispin et al.

(10) Patent No.: US 6,804,564 B2
(45) Date of Patent: Oct. 12, 2004

(54) SYSTEM AND METHOD FOR CONTROLLING AND/OR MONITORING A CONTROL-UNIT GROUP HAVING AT LEAST TWO CONTROL UNITS

(75) Inventors: Norbert Crispin, Ludwigsburg (DE); Wolfgang Haas, Stuttgart (DE); Andreas Frank, Sindelfingen (DE); Thomas Meier, Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/228,407

(22) Filed: Aug. 26, 2002

(65) Prior Publication Data

US 2003/0105537 A1 Jun. 5, 2003

Related U.S. Application Data

(63) Continuation of application No. 10/026,857, filed on Dec. 21, 2001, now abandoned.

(30) Foreign Application Priority Data

Dec. 28, 2000 (DE) .......................................... 100 65 118

(51) Int. Cl.[7] ................................................. G05B 9/02
(52) U.S. Cl. ............................. 700/79; 700/82; 700/20; 701/97; 701/107; 701/92; 701/76; 318/563; 123/406.13
(58) Field of Search .......................... 700/2, 3, 20, 21, 700/79, 82; 701/39, 43, 62, 76, 92, 97, 107; 318/563; 123/339.15, 359, 406.13, 690, 479, 568.16

(56) References Cited

U.S. PATENT DOCUMENTS

| | | | | |
|---|---|---|---|---|
| 4,347,563 A | * | 8/1982 | Paredes et al. ................. 700/8 |
| 4,432,064 A | * | 2/1984 | Barker et al. ................... 702/9 |
| 5,259,473 A | * | 11/1993 | Nishimoto ................... 180/446 |
| 5,630,053 A | * | 5/1997 | Morikawa ..................... 714/47 |
| 5,897,596 A | * | 4/1999 | Kabune et al. ................ 701/29 |
| 5,992,379 A | * | 11/1999 | Brudigam et al. ........ 123/339.1 |
| 6,041,884 A | * | 3/2000 | Shimizu et al. ............. 180/443 |
| 6,125,322 A | * | 9/2000 | Bischof et al. ............. 701/114 |
| 6,628,993 B1 | * | 9/2003 | Bauer ........................... 700/20 |
| 6,650,976 B2 | * | 11/2003 | Wagner et al. ................ 701/29 |
| 2002/0194551 A1 | * | 12/2002 | Mueller et al ................ 714/48 |
| 2003/0083782 A1 | * | 5/2003 | Borrego et al. ............. 700/245 |

FOREIGN PATENT DOCUMENTS

| | | | |
|---|---|---|---|
| DE | 41 33 268 | 4/1993 | ........... B60K/26/00 |
| DE | 44 37 336 | 4/1996 | ........... F02D/41/22 |
| DE | 44 38 714 | 5/1996 | ........... B60K/26/00 |

* cited by examiner

Primary Examiner—Ramesh Patel
Assistant Examiner—Crystal J. Barnes
(74) Attorney, Agent, or Firm—Kenyon & Kenyon

(57) ABSTRACT

A system for controlling and/or monitoring a control-unit group having at least two control units, a first control unit and at least one second control unit, the first control unit being designed for performing its control function and for monitoring this control function, as well as for monitoring the control function of the at least one second control unit.

8 Claims, 1 Drawing Sheet

SYSTEM AND METHOD FOR CONTROLLING AND/OR MONITORING A CONTROL-UNIT GROUP HAVING AT LEAST TWO CONTROL UNITS

RELATED APPLICATION

This application is a continuation of U.S. patent application Ser. No. 10/026,857, filed on Dec. 21, 2001, now abandoned.

BACKGROUND INFORMATION

The increasingly intensive interaction of individual control units is of particular importance for realizing new functions in motor-vehicle electronics.

Modern vehicle equipment includes a plurality of digital control units, e.g. for ignition/injection, ABS, and transmission control. Advantageous properties and additional functions can be realized in that the processes controlled by the individual control units are synchronized, and their parameters are adjusted to one another continuously, i.e., particularly in real time. An example of such a function is the drive slip control, which accordingly reduces the drive torque of the individual wheels for rotating driven wheels.

Information is exchanged between the control units in the conventional manner, essentially via single lines. However, such point-to-point connections can only be advantageously used for a limited number of signals. In this context, a simple, automobile-compatible network topology for the serial transmission of data between the control units can expand the transmission possibilities.

The emerging significant increase in data exchange between the electronic components can no longer be managed using conventional cabling techniques (cable harness) since a cable harness, for example, can barely be handled in the case of high-end cars, among other things, due to its size and to the fact that too many PINs would be present at a few control units. These problems can be solved by using CAN, a serial bus system designed specifically for use in motor vehicles.

In the automotive industry, control unit interfacing is the essential application area for CAN. In the case of control unit interfacing, electronic systems, such as engine management systems, electronic transmission control systems, electronic engine-power management systems (EMS, E-gas) and traction control systems (TCS) are coupled to one another. Typical transmission rates range between about 120 kbit/s and 1 mbit/s. They must be high enough to be able to ensure the required real time properties. An advantage of the serial data transmission medium in comparison with conventional interfaces, such as pulse duty factors, switching signals, and analog signals, is higher speeds without significantly loading the central processing unit (CPU). Moreover, fewer Pins are needed at the control units.

Defective control units can significantly hinder the bus traffic and can also lead to safety-critical conditions. Therefore, CAN controllers are equipped, for example, with mechanisms that can distinguish occasionally occurring interferences from continuous interferences and can localize station malfunctions (control unit malfunctions). This typically occurs via a statistical evaluation of fault situations.

A device for controlling the drive force of a motor vehicle is described in German Patent No. 41 33 268. This device includes a first control unit for controlling the fuel quantity to be injected and a second control unit for controlling the throttle-valve position. Furthermore, a measuring device for determining the rotational speed of the vehicle, for example, is provided, this measuring device including at least two redundant sensors. The first control unit evaluates the signal of the first sensor, and the second control unit evaluates the output signal of an additional sensor of the measuring device. One of the control units checks the two signals for plausibility.

This device only makes it possible to check the sensor signals or the sensor. A fault in the region of a control unit or of the signal transmission between the control units cannot be detected with this device.

A method for controlling an internal combustion engine, in particular a diesel internal combustion engine, using a quantity-determining control element is described in German Patent No. 44 37 336, a first control unit specifying a fuel quantity as a function of first variables, and a second control unit determining an actuating variable for the control element on the basis of the fuel quantity variable and additional variables. This method distinguishes itself in that the second control unit signals the actuating variable back to the first control unit, and the first control unit compares the actuating variable and the fuel quantity variable for implausibility.

Finally, a method and a device for controlling the drive power of a vehicle is described in German Patent No. 44 38 714, only a computing element (microcomputer) for carrying out control functions and monitoring functions being provided for the power control. In this context, at least two independent levels are fixed in the microcomputer, a first level carrying out the control functions, and a second level the monitoring functions.

SUMMARY OF THE INVENTION

The present invention provides a simple monitoring concept for a motor vehicle having different mutually cooperating control units or computing elements, where safety-critical conditions can result in the case of a fault. An object is to detect such safety-critical conditions and to introduce countermeasures, e.g. an emergency control or to switch off a control unit detected as being defective, if necessary. In particular, the goal in this context is to keep the hardware expenditure minimal.

Using the introduced concept that is the basis of the system and method of the present invention, it is possible to monitor a group of control units using only an intrinsically safe control unit that monitors itself and the other control units. On the whole, the procedure according to the present invention results in a system that requires a significantly smaller hardware expenditure in comparison with conventional systems and, thus, can be produced more cost-effectively. The number of control units with which a motor vehicle having a plurality of operating levels must be equipped to ensure reliable operation can be reduced to a minimum since in accordance with the present invention, a single control unit assumes the monitoring function for all control units. The concept of the present invention is particularly suitable for controlling a drive unit of a motor vehicle, in particular for controlling an internal combustion engine.

Advantageously, the means for carrying out the control function of the first control unit and for monitoring this control function as well as the means for monitoring the control functions of at least one second control unit are configured as a microcomputer having at least two operating levels that are independent of one another at least outside of the fault case, the control function and the monitoring function of the first control unit being carried out in a first level, and the monitoring function for the at least one second control unit being carried out in a second level. Such operating levels are advantageously configured as channels within the microcomputer that do not influence each other's functioning at least outside of the fault case. Thus, operational reliability and availability comparable to a control system having two computing units or microcomputers for every control unit can be achieved using only one microcomputer. It should be noted that the operating levels can also be defined in a different manner: For example, it is conceivable to organize the control function of the first control unit in a first operating level and all other monitoring functions in a second operating level.

According to a preferred specific embodiment of the system of the present invention, a third operating level is provided that checks the functioning method of the first control unit or of the microcomputer assigned to this control unit by monitoring the second level performing the monitoring. Such monitoring significantly increases the operational reliability of the system. In this context, it is advantageous, for example, to use an active watchdog that can monitor operation as a question-answer mode.

Advantageously, sensors are provided that under normal conditions are used as redundant sensors for the at least one second control unit, and that, in response to a malfunction of the second control unit being detected, can be assigned to the first control unit to ensure an emergency-operation function with respect to the control function of the at least one second control unit. Such a redundant sensory system, which can be evaluated in the event that the first, intrinsically safe control unit malfunctions, renders it possible to control different safe conditions of the actuator system of the at least one second control unit. In a fault case of the second control unit, it is possible using such sensors to optimally adjust the safe condition for the instantaneous operating point of the second control unit.

Advantageously, introducing safety or emergency measures includes switching off the actuator system of the at least one second control unit and/or switching off the at least one second control unit.

According to a particularly preferred development of the system of the present invention, a central emergency-operation signal line, via which the individual control units are connected to one another, is provided. This measure proves to be advantageous especially for combined units, e.g. for the drive train of the motor vehicle, that must actively trigger (select) a common safe condition. If all control units of the drive train are functioning normally, none of the control units powers this emergency-operation signal line. However, if one of the control units detects a fault, it turns itself off, thereby powering the emergency-operation signal line. In a control unit, this emergency-operation signal line is inactively powered, i.e., the control unit must actively suppress the powering of the emergency-operation signal line during normal operation.

The actuator system connected to this line moves into the emergency-operation position when the line is triggered. An attempt by the connected control unit to activate the actuator system no longer has any effect. The control unit has a lower priority. This emergency-operation strategy can preferably be realized by hardware, thereby making it possible to attain better reliability. For example, it is possible in the case of a drive train, in the event of a fault to move the clutch in the "open" direction for five seconds using a timing relay that is triggered by this emergency-operation control.

DETAILED DESCRIPTION

Figure 1:
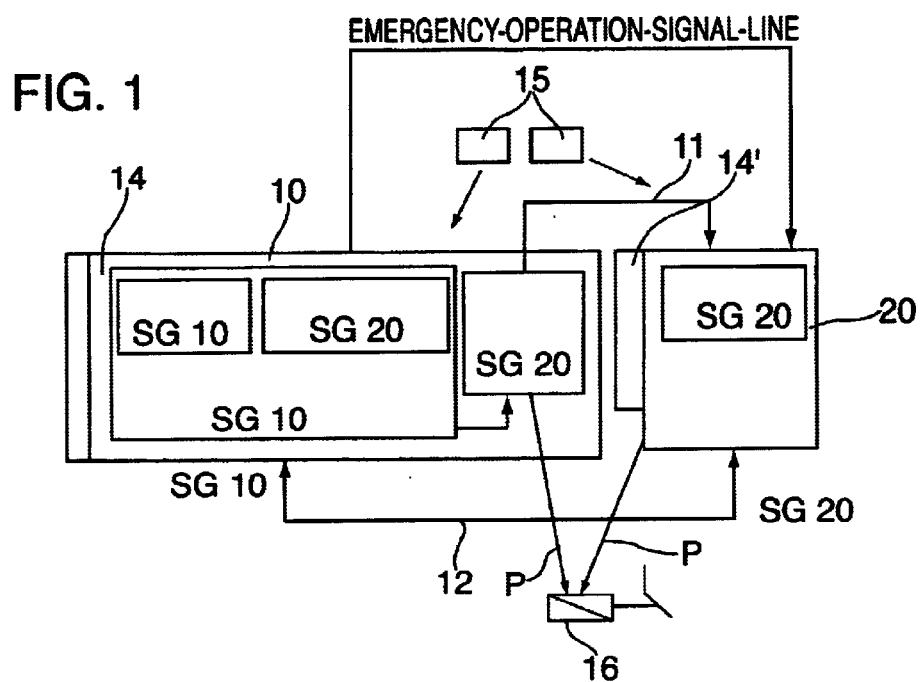
FIG. 1 shows a block diagram to represent a preferred specific embodiment of the device of the present invention.

FIG. 1 shows an overview of a block diagram of a system including two control units, i.e., a control unit group, for controlling the drive unit of a motor vehicle as a preferred specific embodiment of the present invention. A first control unit 10 and a second control unit 20 are shown. It is assumed, for example, that during normal operation, control unit 20 controls the clutch and, in some instances, further actuator system of the motor vehicle.

In FIG. 1, reference numeral 12 designates a communication connection between control units 10 and 20. The control units in the group as well as the normal communication are monitored via communication connection 12. Communication connection 12 is produced as a CAN connection, for example.

Control unit 10 has a plurality of functions, namely carrying out its own control function, monitoring this control function, as well as monitoring control unit 20.

In this context, a microcomputer (not shown in detail, yet shown schematically with reference numeral 14) of first control unit 10 is organized into at least two operating levels. A first level (function SG10) performs the calculations for carrying out the control function of control unit 10. The first level also includes monitoring the second control unit (monitoring SG20). In a second level (monitoring SG10), the control function of the first control unit is monitored.

If first control unit 10 detects a malfunction of second control unit 20, control unit 10 switches off or de-energizes control unit 20 via an output line 11. Since the clutch, which is controlled by control unit 20, is to be operated or closed as a function of the vehicle speed, control unit 10 assumes an emergency-operation function with respect to control unit 20. Rudimentary control is sufficient for this emergency-operation function. Control unit 10 receives the input quantities necessary for satisfying the emergency-operation function of the clutch controlled during normal operation by control unit 20 from sensors (schematically shown with reference numeral 15), which function as redundant sensors for control unit 20 during normal operation. A microcomputer of control unit 20 is schematically shown and designated by 14'.

In this context, it must be ensured that first control unit 10, which is capable of switching off the at least one second (not intrinsically safe) control unit 20, is intrinsically safe, i.e., when first control unit 10 is in operation, its correct functioning must be ensured. To ensure this, the second operating level, namely monitoring the control function of control unit 10 via the monitoring level (monitoring SG10), is provided. Thus, if a fault condition of control unit 20 is detected, this results in the monitoring function of second control unit 20 in first control unit 10 bringing about the emergency operation of the second control unit.

If such a monitoring concept is achieved, there is a function restriction of first control unit 10 inasmuch as first control unit 10 is switched off in response to a fault, and in the case of an error of second control unit 20, it is no longer ensured that control unit 10 can trigger or control the actively safe condition. In this instance, it is possible, for example, to transfer second control unit 20 to limited operation, i.e., second control unit 20 only operates in operating points in which switching off in the event of a fault signifies a safe condition.

Since when switching off first control unit 10 the external protection of the operation of second control unit 20 is no longer ensured (since the monitoring function of the second control unit runs in first control unit 10), the reliable operation of second control unit 20 is no longer ensured. It is then provided that second control unit 20 triggers the current safe condition and shuts itself off.

It is advantageous for combined units (drive train) that must actively trigger a common safe condition, to combine these units via a central emergency-operation line [(not shown)]. If all of the control units are operating normally, none of these control units powers this emergency-operation line. However, if one of the control units detects a fault, it turns itself off, thereby powering the emergency-operation line. In a control unit, this line is inactively powered, i.e., the control unit must actively suppress the powering of the emergency line during normal operation.

The actuator system connected to this emergency-operation line moves into the emergency-operation position when the emergency line is activated. An attempt by the connected control unit to activate the actuator system no longer has an effect. The control unit has a lower priority. This emergency-operation strategy can preferably be realized by hardware, thereby making it possible to attain better reliability.

Connecting the represented system to an actuator system is schematically represented by arrow P and an actuator system configured in any manner desired and designated by reference numeral 16. It is preferred to configure the actuation of actuator system 16 as a wired-or-function, i.e., given the presence of a low-level signal (of an "off" signal) at one of the two control units, the actuator system can be switched off. In other words, when one of the control units transmits a low-level signal to the actuator system, it is switched off. Additional alternative manners of activating the actuator system are also conceivable. The redundant sensory system of control system 10 makes it also possible to trigger different safe conditions of one of the actuator systems assigned to control unit 20, for example. In the related art, signals from different control units are redundantly input, for example, and exchanged via a communication channel (e.g. CAN) to redundantly give plausibility to signals. Such knowledge can also be used in control unit 10 to adjust the safe condition for the active operating point of control unit 20 in the event of a fault of control unit 20.

A particular ability of the represented topology is the ability of control unit 10 to differentiate between repeating and sporadic faults of control unit 20. On the basis of this ability, appropriate, different countermeasures can be introduced, e.g. control unit 20 can be briefly switched off in response to a sporadic fault being detected, while, in response to a repeating fault being detected, control unit 20 can be switched off until the instant at which the vehicle ignition is switched off.

According to the present invention, as a result of a separate control unit performing the switching-off operation, it is possible in a simpler manner to also actively trigger safe conditions of the second control unit. For example, by switching off control unit 20 and simply activating the essential actuator system of control unit 20, control unit 10 can achieve a safe condition for the entire system. The reason is the already redundant hardware of control unit 10.

A stand alone control unit 20 could not actively set a safe condition in many fault cases without significant redundant hardware use.

Figure 2:
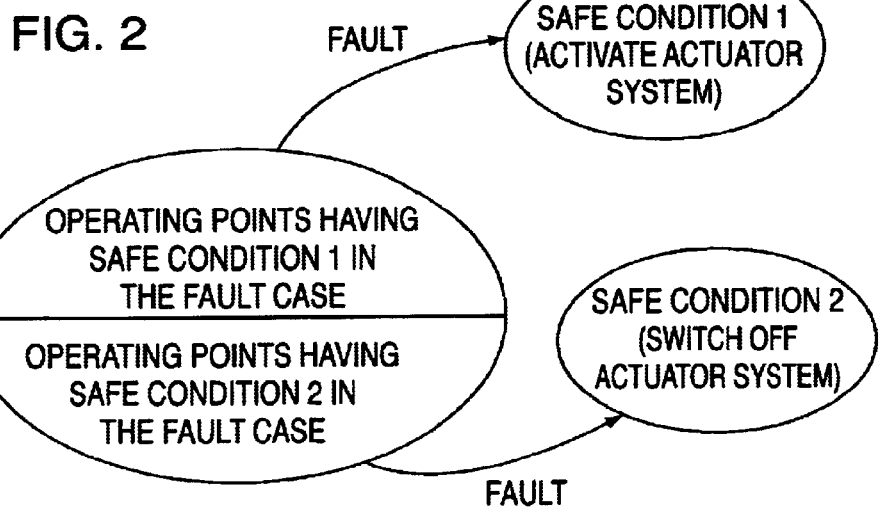
FIG. 2 shows a schematic representation to explain a particularly preferred specific embodiment of the method according to the present invention.

This factual situation is schematically represented in FIG. 2. In this instance, a difference is made between operating points having safe condition 1 in the fault case and operating points having safe condition 2 in the fault case. In the case of a determined fault when an operating point having safe condition 1 is present, a safe condition 1 is produced by actively activating an actuator system. Given the occurrence of a fault during an operating point having safe condition 2, a safe condition 2 is produced by switching off the actuator system or the system. This is explained using an example: if a fault occurs during a closed clutch, it is not possible for safety reasons to simply switch off the system. Rather, it is necessary to open the clutch using active control (safe condition 1).

What is claimed is:

1. A system for at least one of controlling and monitoring a control-unit group including a first control unit and at least one second control unit, the system comprising:

means, in the first control unit, for performing a control function of the first control unit, for monitoring the control function of the first control unit, and for monitoring a control function of the at least one second control unit; and a central emergency-operation signal line for triggering in the event of a malfunction of at least one of the first control unit and the at least one second wherein the first control unit is intrinsically safe and the at least one second control unit is not intrinsically safe control unit.

2. The system according to claim 1, further comprising:

a microcomputer in the first control unit; and wherein the control function and the monitoring function of the first control unit are performed in a first operating level and the monitoring function for the at least one second control unit is performed in a second operating level, the first and second operating levels being independent of one another at least outside of a fault case.

3. The system according to claim 2, wherein, in a third operating level, a functioning method of the first control unit is checked by monitoring the second operating level that performs the monitoring.

4. The system according to claim 2, wherein the microcomputer is adapted to introduce safety/emergency measures including at least one of (a) switching off an actuator system of the at least one second control unit and (b) switching off the at least one second control unit.

5. The system according to claim 1, further comprising:

sensors functioning as redundant sensors for the at least one second control unit in a normal state, the sensors, in response to a malfunction of the at least one second control unit being detected, being assigned to the first control unit to ensure an emergency-operation function with respect to a normal state control function of the at least one second control unit.

6. A method for at least one of controlling and monitoring a control-unit group including a first control unit and at least one second control unit, the method comprising:

performing by the first control unit a first drive unit control function of the first control unit;

performing by the first control unit a monitoring of the first control function of the first control unit;

performing by the first control unit a monitoring of at least one second drive unit control function of the at least one second control unit; and triggering a central emergency-operation signal line in the event of a malfunction of at least one of the first control unit and the at least one second control unit wherein the first control unit is intrinsically safe and the at least one second control unit is not intrinsically safe.

7. A method for at least one of controlling and monitoring a control-unit group including a first control unit and at least one second control unit, the method comprising:

performing by the first control unit a first drive unit control function of the first control unit;

performing by the first control unit a monitoring of the first control function of the first control unit;

performing by the first control unit a monitoring of at least one second drive unit control function of the at least one second control unit;

wherein the first control unit is intrinsically safe and the at least one second control unit is not intrinsically safe.

8. A system for at least one of controlling and monitoring a control-unit group including a first control unit and at least one second control unit, the system comprising:

means, in the first control unit, for performing a control function of the first control unit, for monitoring the control function of the first control unit, and for monitoring a control function of the at least one second control unit;

wherein the first control unit is intrinsically safe and the at least one second control unit is not intrinsically safe.

* * * * *

UNITED STATES PATENT AND TRADEMARK OFFICE
CERTIFICATE OF CORRECTION

PATENT NO. : 6,804,564 B2
DATED : October 12, 2004
INVENTOR(S) : Norbert Crispin et al.

It is certified that error appears in the above-identified patent and that said Letters Patent is hereby corrected as shown below:

Column 1,
Line 54, change "Pins" to -- PINs --.

Column 5,
Lines 14-15, change "line [(not shown)]." to -- line. --.

Column 6,
Line 29, change "one second wherein" to -- one second control unit wherein --.
Line 31, change "is not intrinsically safe control unit." to -- is not intrinsically safe. --.

Signed and Sealed this

Twenty-seventh Day of September, 2005

JON W. DUDAS
*Director of the United States Patent and Trademark Office*